(12) United States Patent
Cockerill et al.

(10) Patent No.: US 12,368,360 B2
(45) Date of Patent: Jul. 22, 2025

(54) POWER COUPLING FOR FREE PISTON MOVER

(71) Applicant: Libertine FPE Ltd, York (GB)

(72) Inventors: Samuel Edward Cockerill, York (GB); Matthew Viele, Florissant, CO (US)

(73) Assignee: Libertine FPE Ltd, York (GB)

( * ) Notice: Subject to any disclaimer, the term of this patent is extended or adjusted under 35 U.S.C. 154(b) by 139 days.

(21) Appl. No.: 17/785,366

(22) PCT Filed: Dec. 15, 2020

(86) PCT No.: PCT/GB2020/053220
§ 371 (c)(1),
(2) Date: Jun. 14, 2022

(87) PCT Pub. No.: WO2021/123754
PCT Pub. Date: Jun. 24, 2021

(65) Prior Publication Data
US 2023/0035014 A1    Feb. 2, 2023

(30) Foreign Application Priority Data
Dec. 16, 2019  (GB) .................................. 1918525

(51) Int. Cl.
*H02K 41/02* (2006.01)
*H02K 1/12* (2006.01)
*H02K 11/20* (2016.01)

(52) U.S. Cl.
CPC ............... *H02K 41/02* (2013.01); *H02K 1/12* (2013.01); *H02K 11/20* (2016.01)

(58) Field of Classification Search
CPC .......... H02K 41/02; H02K 1/12; H02K 11/20; H02K 7/1884; H02K 35/02; F01B 7/02;
(Continued)

(56) References Cited

U.S. PATENT DOCUMENTS

| 4,532,431 A | 7/1985 | Iliev et al. |
| 2007/0158945 A1 | 7/2007 | Annen et al. |

(Continued)

FOREIGN PATENT DOCUMENTS

| DE | 202015106332 U1 | 12/2015 |
| DE | 102017127650 A1 | 5/2019 |

(Continued)

OTHER PUBLICATIONS

Combined Search and Examination Report for UK Patent Application No. GB1918525.5, mailed May 15, 2020.
(Continued)

*Primary Examiner* — Christopher M Koehler
*Assistant Examiner* — Viswanathan Subramanian
(74) *Attorney, Agent, or Firm* — Andrus Intellectual Property Law, LLP

(57) ABSTRACT

A linear electro-mechanical system comprising: a stator including at least first and second stator electronic circuits or groups of circuits; a free piston mover movable in a reciprocating motion relative to the stator, the free piston including: a piston surface; a translator configured so that an electromagnetic force may be applied on the free piston mover by one or more of the stator electronic circuits or groups of circuits; and one or more translator electronic circuits, the system further comprising a switching device for each of the first and second stator electronic circuits or groups of circuits such that the current in each of the first and second stator electronic circuits or groups of circuits is independently controllable, and wherein at least one of the translator electronic circuits is configured to receive power from at least one of the independently controlled stator electronic circuits or groups of circuits during at least part of the stroke of the free piston mover.

11 Claims, 13 Drawing Sheets

(58) Field of Classification Search
CPC ...... F02B 63/041; F02B 71/00; F02B 75/285; F02P 1/04; F02P 1/08; F02P 3/02; F02P 3/06; F02P 13/00; F04B 17/04; F04B 35/045; F04B 49/06
See application file for complete search history.

(56) References Cited

U.S. PATENT DOCUMENTS

| | | | |
|---|---|---|---|
| 2018/0023940 A1 | 1/2018 | Madson et al. | |
| 2019/0217831 A1* | 7/2019 | Viele | B60D 1/245 |

FOREIGN PATENT DOCUMENTS

| | | | |
|---|---|---|---|
| EP | 2473725 | B1 | 7/2012 |
| GB | 2219671 | A | 10/1989 |
| JP | 2005155345 | A | 6/2005 |
| JP | 2007077951 | A | 3/2007 |
| JP | 2010119222 | A | 5/2010 |
| JP | 2011089641 | A | 5/2011 |
| JP | 2012205398 | A | 10/2012 |
| JP | 2013504002 | A | 2/2013 |
| JP | 2014190297 | A | 10/2014 |
| WO | 2007081789 | A2 | 7/2007 |

OTHER PUBLICATIONS

International Search Report and Written Opinion for International Patent Application No. PCT/GB2020/053220, mailed Mar. 30, 2021.
Office Action for Japanese Patent Application No. 2022-536923, dated May 2, 2024.
Communication Pursuant to Article 94(3) EPC for European Patent Application No. 20838156.6, dated Nov. 29, 2024.

* cited by examiner

Section A – A

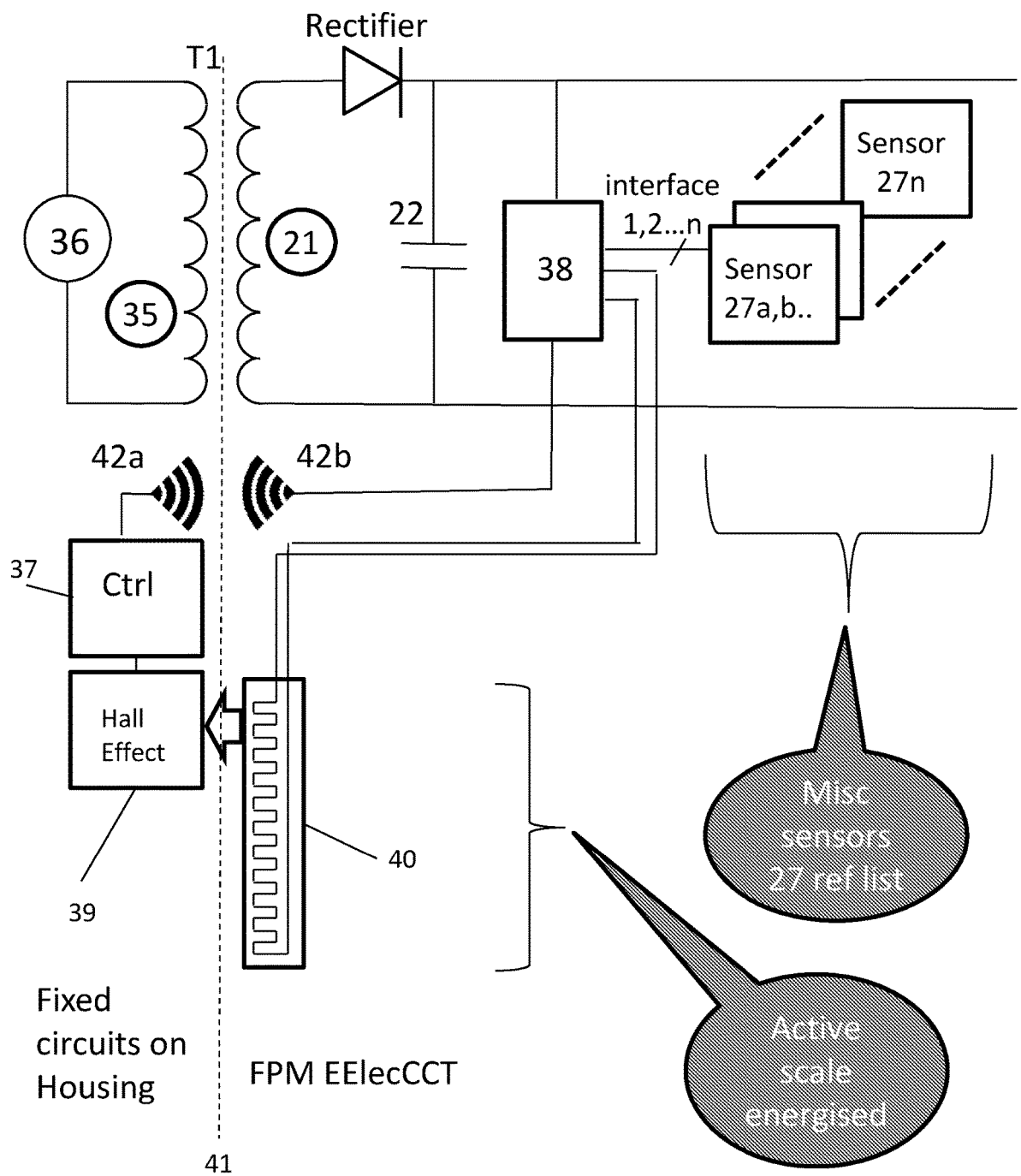

POWER COUPLING FOR FREE PISTON MOVER

CROSS-REFERENCE TO RELATED APPLICATIONS

This application is the U.S. national stage application of International Application PCT/GB2020/053220, filed Dec. 15, 2020, which international application was published on Jun. 24, 2021, as International Publication WO 2021/123754 in the English language. The international application is incorporated herein by reference, in entirety. The international application claims priority to GB Patent Application No. 1918525.5, filed Dec. 16, 2019, which is incorporated herein by reference, in entirety.

The present invention relates to a Free Piston Mover (FPM) which may generally act as a piston of a conventional combustion engine, or may act as a Translator of a Linear Electrical Machine (LEM), or may act as a piston of a Linear Thermofluidic System (LTFS).

A Linear Power System (LPS) formed by incorporating at least one LEM and LTFS may further be incorporated within a Free Piston Linear Generator (FPLG), a Linear Motor Reciprocating Compressor (LMRC), a Free Piston Gas Expander (FPGE), a Linear Motor Reciprocating Pump (LMRP) or a Linear Motor Reciprocating Actuator (LMRA) or other type of Linear Power System product.

These various types of Linear Power System (LPS) product, each incorporating one or more FPMs, are well known in themselves. In each case there is a Linear Electro-Mechanical System and a Linear Thermo-Fluidic System which are coupled through the linear motion of the Free Piston Mover.

Optimal system performance for such products typically requires some combination of efficiency, repeatability, precision, reliability and (in the case of Linear Power System products incorporating more than one FPM) synchronisation. Optimal system performance often depends on the precise control of FPM movement.

The total addressable market for products incorporating FPMs is in excess of $100 bn p.a. and 200 m units p.a. The largest application within this total addressable market is for FPLG products which have the potential to displace conventional internal combustion engines from automotive and distributed power generation applications.

To date, commercial exploitation of products incorporating FPMs has remained limited due to the inadequacy of existing control methods and control systems governing piston motion to achieve optimal system performance. Piston motion control within products incorporating FPMs has been cited by experts in the field of the present invention as the most significant unresolved challenge to widespread use of products incorporating FPMs.

In addition to the control method employed for control of FPMs within Linear Electrical Mechanical Systems (LEMS) two further limitations in the prior art limit the opportunity to exploit the benefits of LEM in particular to support adaptation of a reaction in a working chamber and controllable motion of the LEM and resulting compression ratio:

1. Sensing of the parameters of motion including but not limited to position and velocity for the FPM which may typically be mechanically disconnected by any fixed linkage; and, and thermodynamic environment of the cylinder in which it the TPM moves; and, its working chamber.

2. Optimised combustion initiation (including but not limited to spark ignition) and the efficient reaction of fuel mixture within the working chamber.

According to the present invention there is provided a linear electro-mechanical system comprising: a stator including at least first and second stator electronic circuits or groups of circuits; a free piston mover movable in a reciprocating motion relative to the stator, the free piston including: a piston surface; a translator configured so that an electromagnetic force may be applied on the free piston mover by one or more of the stator electronic circuits or groups of circuits; and one or more translator electronic circuits (EElecCCT), the system further comprising a switching device for each of the first and second stator electronic circuits or groups of circuits such that the current in each of the first and second stator electronic circuits or groups of circuits is independently controllable, and wherein at least one of the translator electronic circuits is configured to receive power from at least one of the independently controlled stator electronic circuits or groups of circuits during at least part of the stroke of the free piston mover.

The present invention will now be described by way of example with reference to the accompanying drawings. In the drawings:

FIG. 12 illustrates alternative schematics for Embedded Electronic Circuit architectures.

FIG. 1 is a simplified external view of the mechanical assembly of an example of a Linear Power System (LPS) 1, showing the Free Piston Mover (FPM) motion axis 2 and section plane AA.

Figure 1:
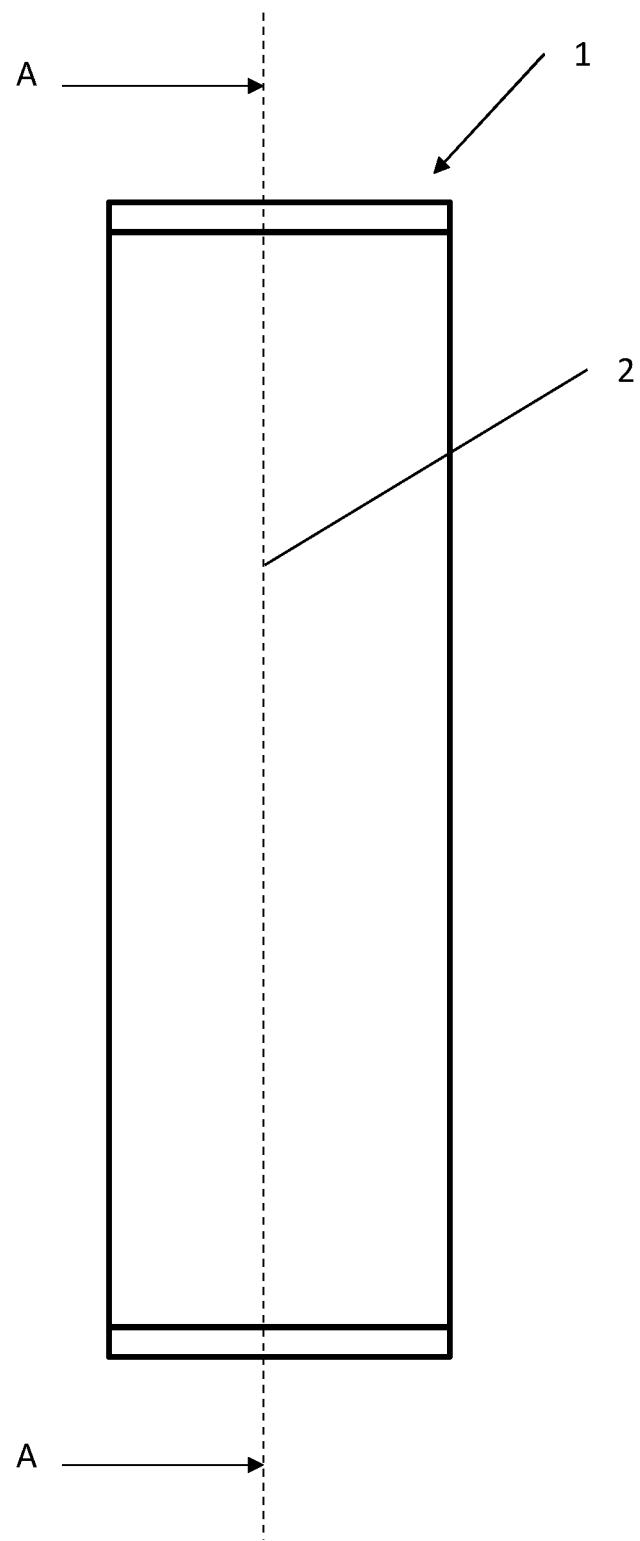
FIG. 1 is an external view of an example of a LPS showing section plane AA and the motion axis.
Figure 2:
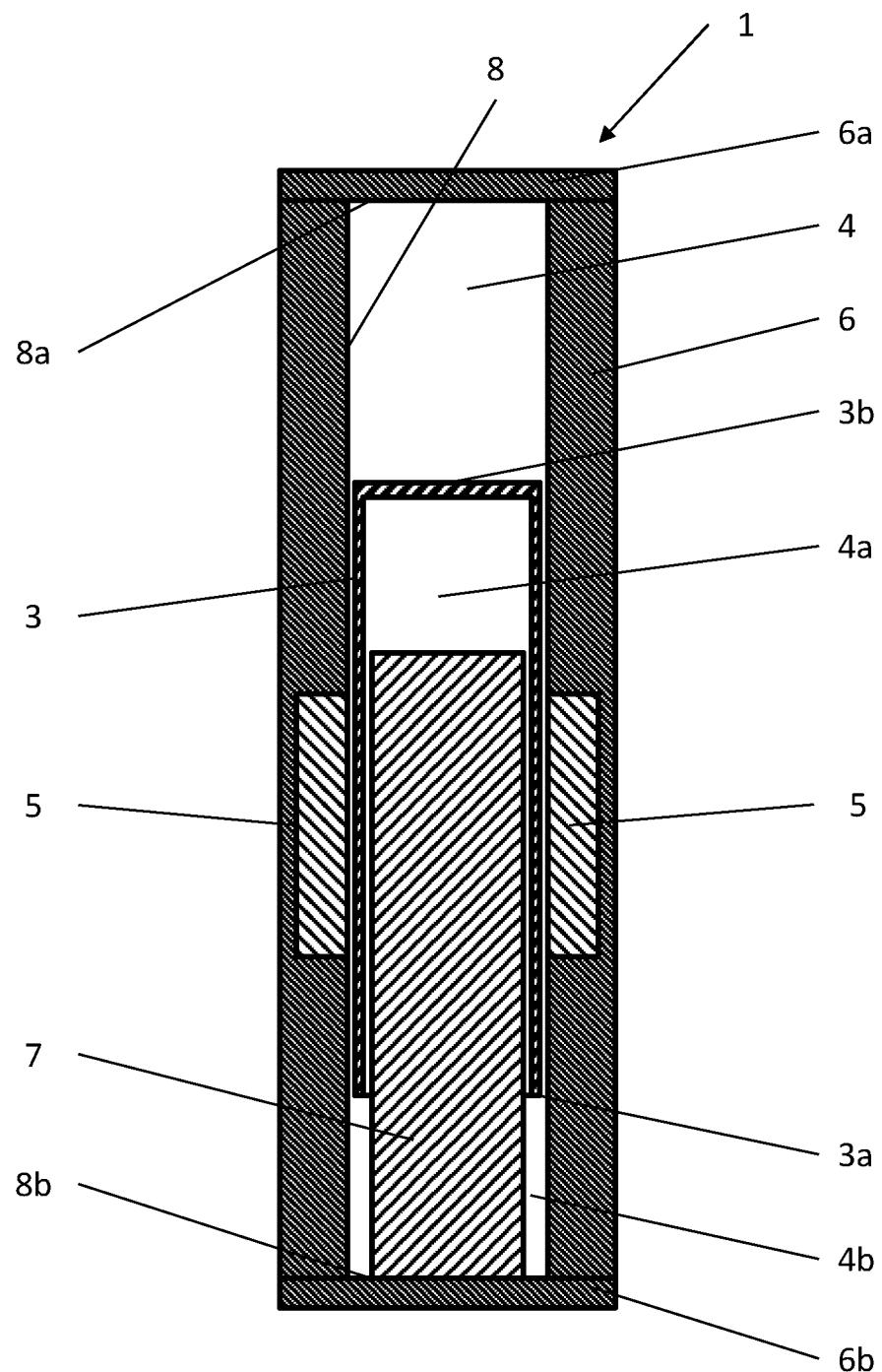
FIG. 2 is Section AA showing the FPM and key features of the LEMS and LTFS.

FIG. 2 is a section view through plane AA showing the Free Piston Mover (FPM) 3 and key features of the Linear Electrical Mechanical System (LEMS) and Linear Thermofluidic System (LTFS) within the LPS example depicted in FIG. 1, including the working chamber 4 of the LTFS. Many alternative LPS implementations are possible, each comprising at least one LEMS and one LTFS. The LEMS includes a Stator 5, and a LPS housing 6 defining a working cylinder 8. The ends of the LPS housing in this example are closed by housing end components 6a, 6b The FPM 3 acts as the translator of the LEMS. In the example shown the FPM 3 is open at one end 3a to allow it to pass over a fixed central core 7 whilst moving within a surrounding cylinder 8 of the LPS housing 6. In this example the FPM 3 is closed at one end 3b so that a working chamber 4 is formed within the cylinder 8, and between the cylinder end wall 8a of the LPS housing end 6a and the closed end 3b of the FPM 3. The closed end 3b facing the working chamber may be referred to as the piston crown 24 which may be part of the main bulk of the FPM 3 as indicated in FIG. 2 for simplicity or a separate attached part or subassembly that is attached to FPM 3.

In a LPS application such as a Free Piston Linear Generator (also known as a Free Piston Engine) or Free Piston Gas Expander, the working chamber 4 may be used to apply a force on the closed end 3b of the FPM 3 by combustion, by introduction of a high pressure gas, or by a phase change. The associated features that may be included within these types of LPS (for example fuel and air supply, valves and ignition features) are not shown for clarity.

In the example embodiment shown in FIGS. 1 and 2, two further volumes 4a, 4b are defined between the central core 7 and the FPM 3, and at the open end of the FPM 3a. Each may act as a bounce chamber in which changes in pressure within these chambers 4a, 4b caused by the movement of the FPM 3 result in the exchange of energy between the kinetic energy of the FPM 3 and energy stored in the compressed gas within the bounce chambers 4a, 4b.

The FPM 3 is formed to include one or more magnetically permeable or magnetised elements (not shown) which interact with Stator 5 to influence the current flowing within the Stator 5 and produce or vary a linear electromagnetic force acting on the FPM 3.

When the LPS 1 acts as a type of linear motor or actuator, electrical power input to the Stator 5 causes motion of the FPM 3. When the LPS 1 acts as a type of linear generator, electrical power output from the Stator 5 is produced by motion of the FPM 3.

When the working chamber 4 acts as a combustion chamber converting fuel energy into mechanical work acting upon the FPM 3, the performance of the LPS depends on the timing, speed and completeness of the combustion reaction and the resulting emissions remaining in the working fluid following this reaction. The system performance of the LPS according to these characteristics depends critically on the linear motion profile of the FPM 3 with time.

Figure 3:
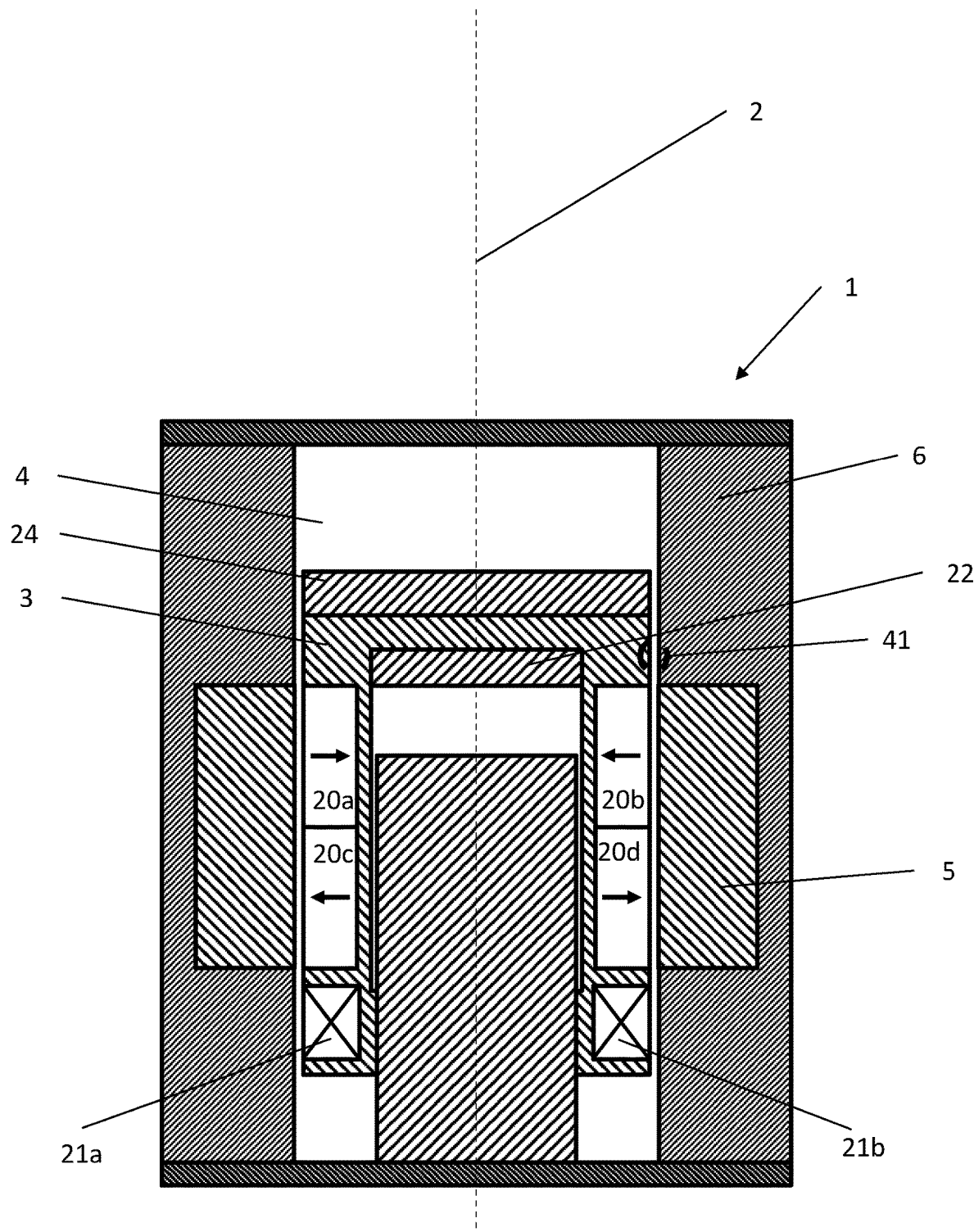
FIG. 3 is Section AA having additional detail.

FIG. 3 shows a further expanded view of the LPS of FIGS. 1 and 2. The magnetically permeable or magnetised elements 20 omitted from FIG. 2 are shown aligned with the stator 5. The features 20a and 20b in this example illustrate sections through the same ring of magnetically permeable material however 20a and 20b may alternatively be separate elements; similarly in this example, 20c and 20d is a further ring of magnetically permeable or permanent magnetic material, but may alternatively be separate elements. In the case where material 20a/b and material 20c/d are permanent magnetic materials and these may be magnetised in different orientations as indicated by the arrows. Whilst the arrows indicate here that they are in opposite polarity the axis of polarisation may be any angle and indeed may rotate at an angle less than 180 degrees and preferably less than 90 degrees along a line of such magnetically permeable or magnetised sections of material.

FIG. 3 further illustrates that the closed end 3b of FPM 3 facing the working chamber may be referred to as the piston crown 24 to aid further discussion. The piston crown 24 may be region of the main bulk of the FPM 3 or a separate attached part or subassembly that is attached to FPM 3.

FIG. 3 further illustrates a translator electronic circuit, such as a power receiving means 21 and which is formed within or attached to the FPM 3 in this example as a coil about the motion axis 2 whereby 21a and 21b represent sections through the same coil having at least one turn of a conductor. The at least one power receiving means is disposed to cooperate with at least one power transmitting means 23 located in the LPS housing 6 whereby 23a and 23b represent sections through the same coil having at least one turn of a conductor. The FPM 3 is shown at a position along the LPS motion axis 2 causing the power transmitting means 23 and the power receiving means 21 are shown to be aligned such that the transfer of power is supported as if in a transformer. Depending on position of the FPM along the motion axis power transmitting means 23 and power receiving means 21 may spend periods of time during some or all strokes where they are out of alignment and unable to exchange power however in alternative configurations the geometry of the design and FPM motion range may facilitate continuous power exchange.

FIG. 3 also shows an energy storage means 22 on board the FPM. The energy storage means 22 may be for example but not limited to a capacitor, super-capacitor (also known as a "super-cap") or a battery or one or more cells of a battery.

The energy storage means 22 is disposed to move with the FPM 3 making power available throughout its stroke especially when the power receiving means 21 is not presently coupled to a power transmitting means 23 thereby affording power to be made available to onboard combustion initiation means and EElecCct including sensors. Additionally, the energy storage means may be required to provide EElecCct in particular but not limited to combustion initiation means (not shown) with high levels of electrical current.

When the position of the FPM 3 along the LPS motion axis aligns energy transmitting means with the energy receiving means the coupled power may supply the fixed circuits to the translator thereby energising on board circuits and or being stored in the energy store 22.

Figure 4:
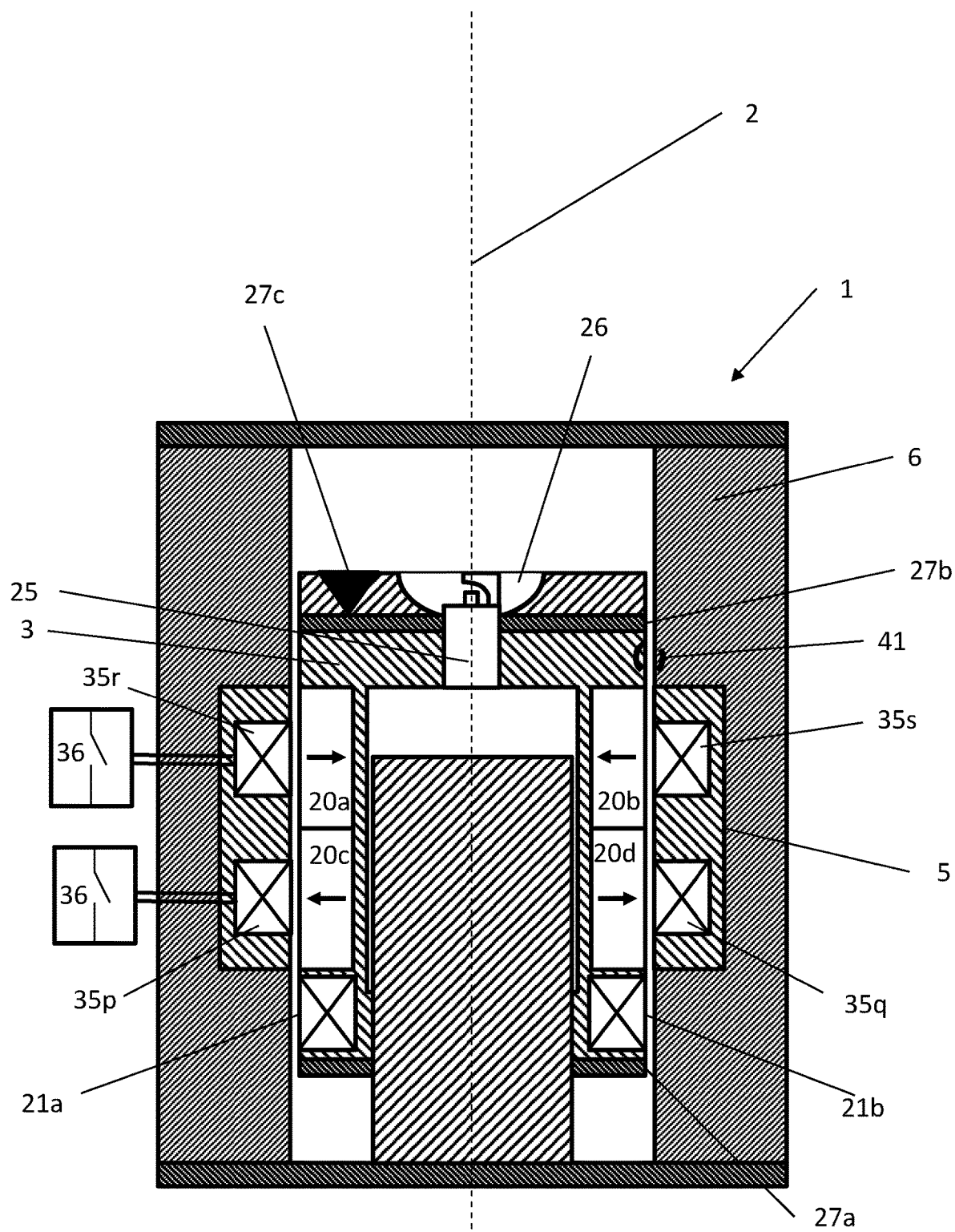
FIG. 4 is Section AA having additional detail showing power transmitting and receiving means, and chamber sensor means and combustion initiation means

FIG. 4 illustrates that the power transmitting means 23 shown in FIG. 3 with coil switching means 36, and also illustrating chamber sensor 27c and combustion initiation means 25 recessed in piston crown feature 26. Sensor 27c and combustion initiation means 25 may be powered by the power coupling means according to the present invention. The combustion initiation means 25 may be deployed in or on the piston crown 22 of the FPM 3. There are many types of combustion initiation means 25 as discussed in the definition section herein; in this example the combustion initiation means 25 is illustrated as a spark device in this case a J-type spark plug that may be screwed or clamped into the piston crown 24. Further the spark device is shown in a squish bowl 26 feature of the piston crown 24. The combustion initiation means 25 is connected to other EElecCct which may include energy storage means 22 not shown. Examples covering two possible alternative architectures are described in relation to the schematics of FIG. 12.

FIG. 4 also illustrates placement of sensor means 27 which may be deployed on or within the FPM 3 at any position. Three example positions are shown for sensor means at 27a, 27b and 27c.

FPM sensor means 27a may have a relatively low temperature environment being close to bounce chamber 4b farthest from the piston crown 24 which is adjacent to the working chamber 4 where combustion or other thermal expansion events may occur causing localised heating. FPM sensor means 27a may include but not be limited to single-axis or multi-axis acceleration sensors and this region may for example be the preferred area for deployment of other EElecCct including digital and analog circuits, microprocessors, memory, energy storage means, data transmitter, data receiver, and other EElectCct that could be flexibly deployed about the FPM 3.

Where 27a or another location for EElectCct is a data transmitter and or data receiver it supports communication preferably serial data communication between cooperating circuits of on the FPM 3 and the LPS housing 6 or LPS housing ends 6a, 6b. As discussed for power transmitting means and power receiving means these are preferably wireless due to the relative motion of the FPM and the LPS housing. Some aspects of the data transmitter and data receiver may be second functions of some aspects of the power transmitting means and power receiving means for example they may share common coupling coils which are aligned for at least a part of the LPM motion along the motion axis 2. There are many alternative implementation approaches that may be employed for data communication between the LPS housing and the FPM as discussed in relation to the definitions of the data transmitter and data receiver some may make be aligned longitudinally parallel to the motion axis thereby benefiting from extended line of sight alignment across the one or other bounce chamber 4a or 4b for example.

FPM sensor means 27b close to the working chamber 4 may include but not be limited to a piston temperature sensor and other sensors that must be in this region in particular for function reasons for example to minimise circuit path length for high current circuits supplying some types of combustion initiation means 25.

Similarly, LTFS sensor means 27c may be required to be deployed in the most hostile region of the FPM close to the working chamber 4, for example but not limited to working chamber bulk gas pressure sensor, gas temperature sensor.

Figure 5:
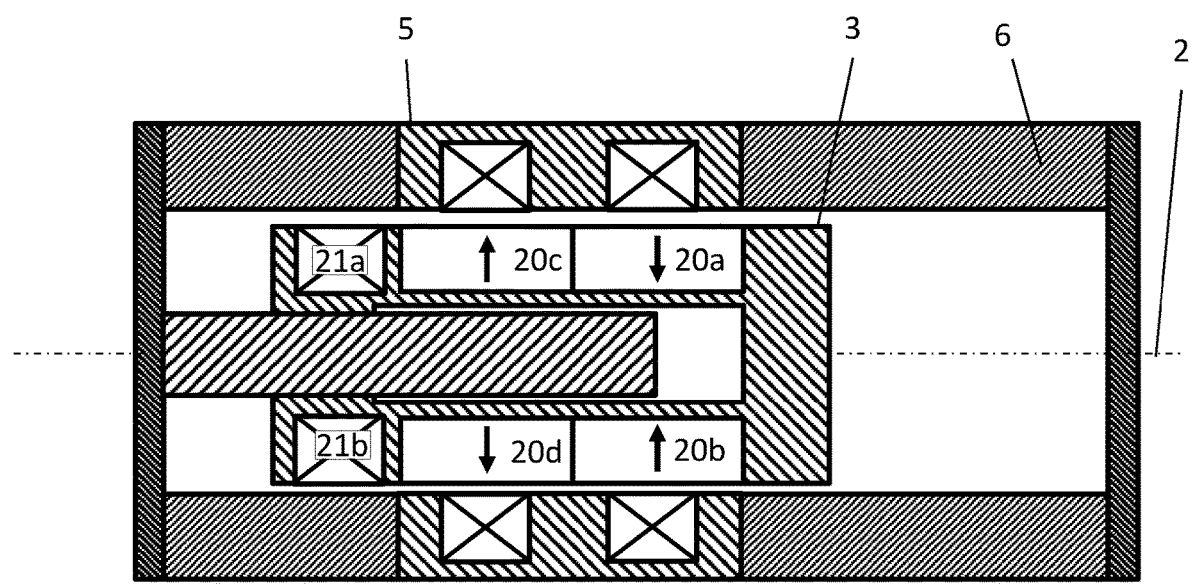
FIG. 5 is a simplified rotated view of Section AA.
Figure 6A:
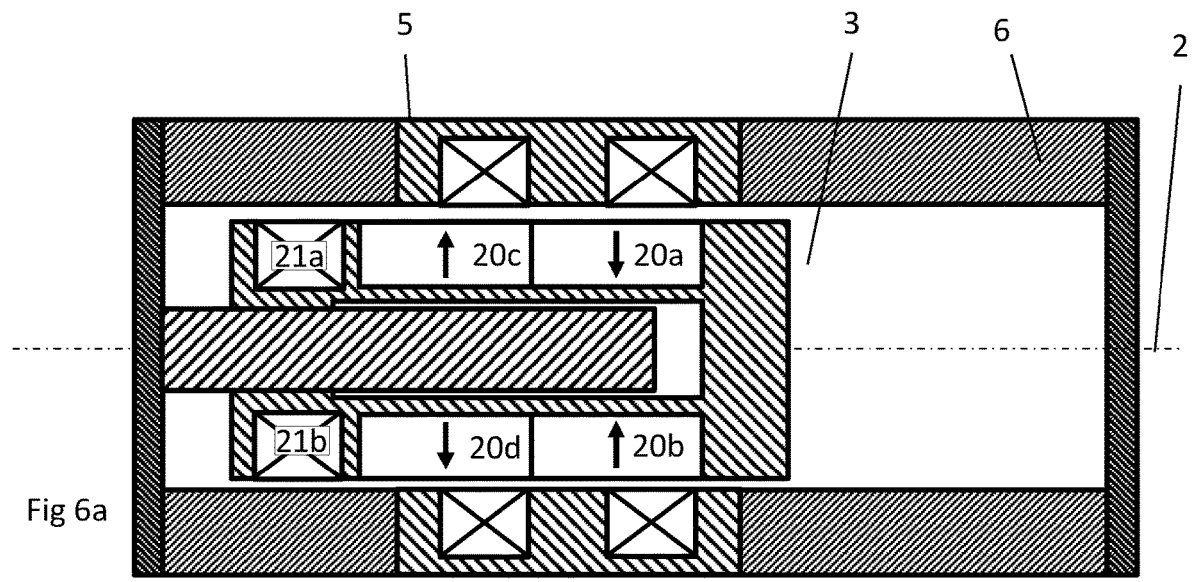
FIG. 6 is a simplified rotated view of Section AA having the FPM at illustrative positions as it moves through a stroke.
Figure 6B:
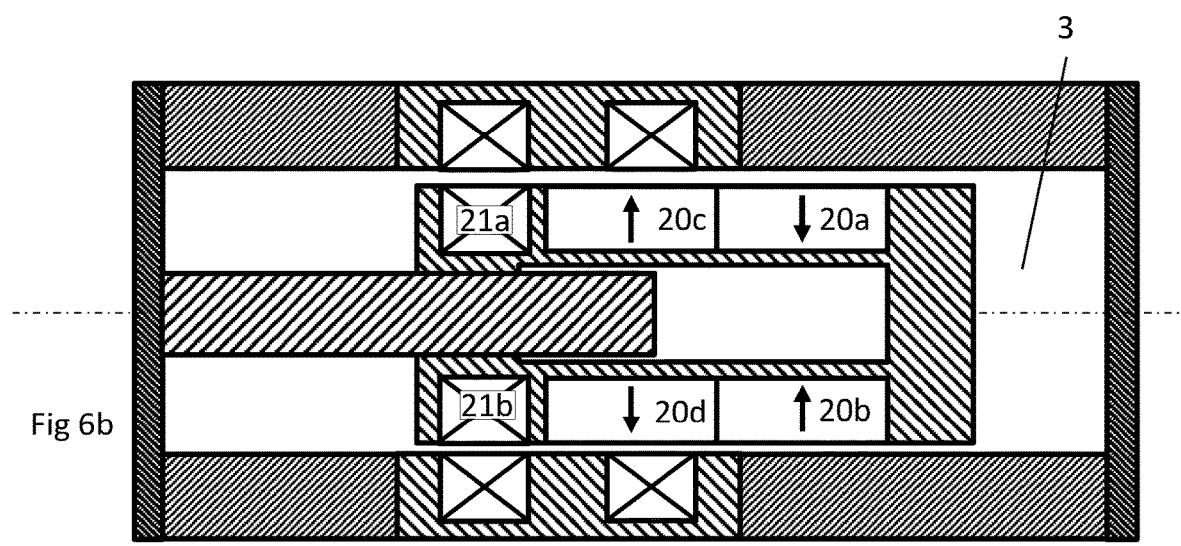
Figure 6C:
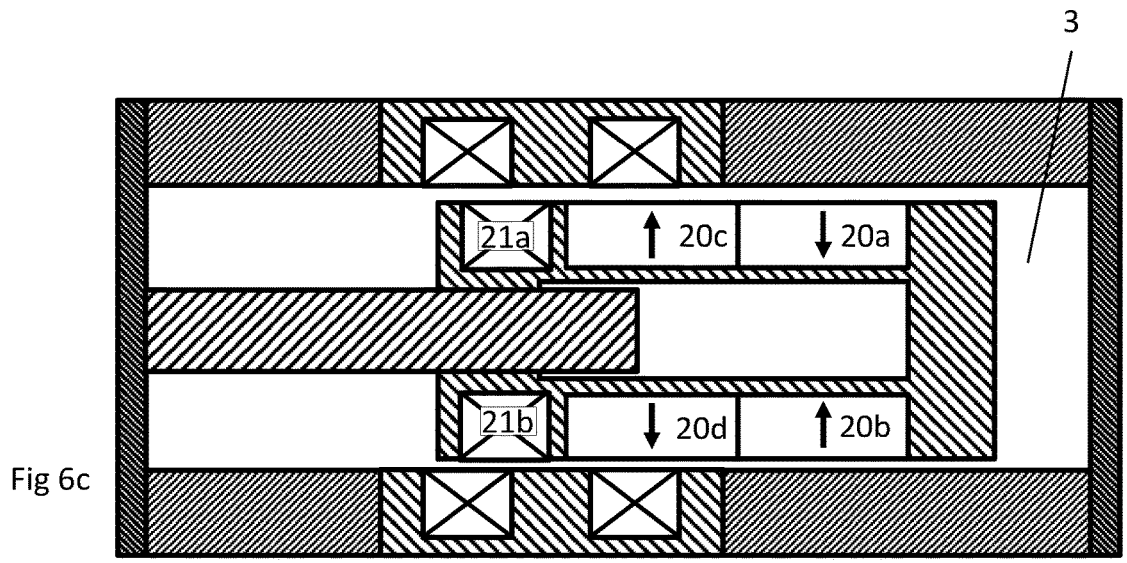

FIG. 5 is a simplified rotated view of Section AA showing the same features as FIG. 3 an orientation with axis 2 shown perpendicular to than in FIG. 3 and corresponding to the views in FIGS. 6a, 6b and 6c.

FIGS. 6a, 6b and 6c are simplified rotated view of Section AA having the FPM at illustrative positions as it moves through a stroke. During this stroke, the power receiving coil 21a/21b enters the stator 5 in FIG. 6b and remains within the stator 5 in FIG. 6c.

Figure 7:
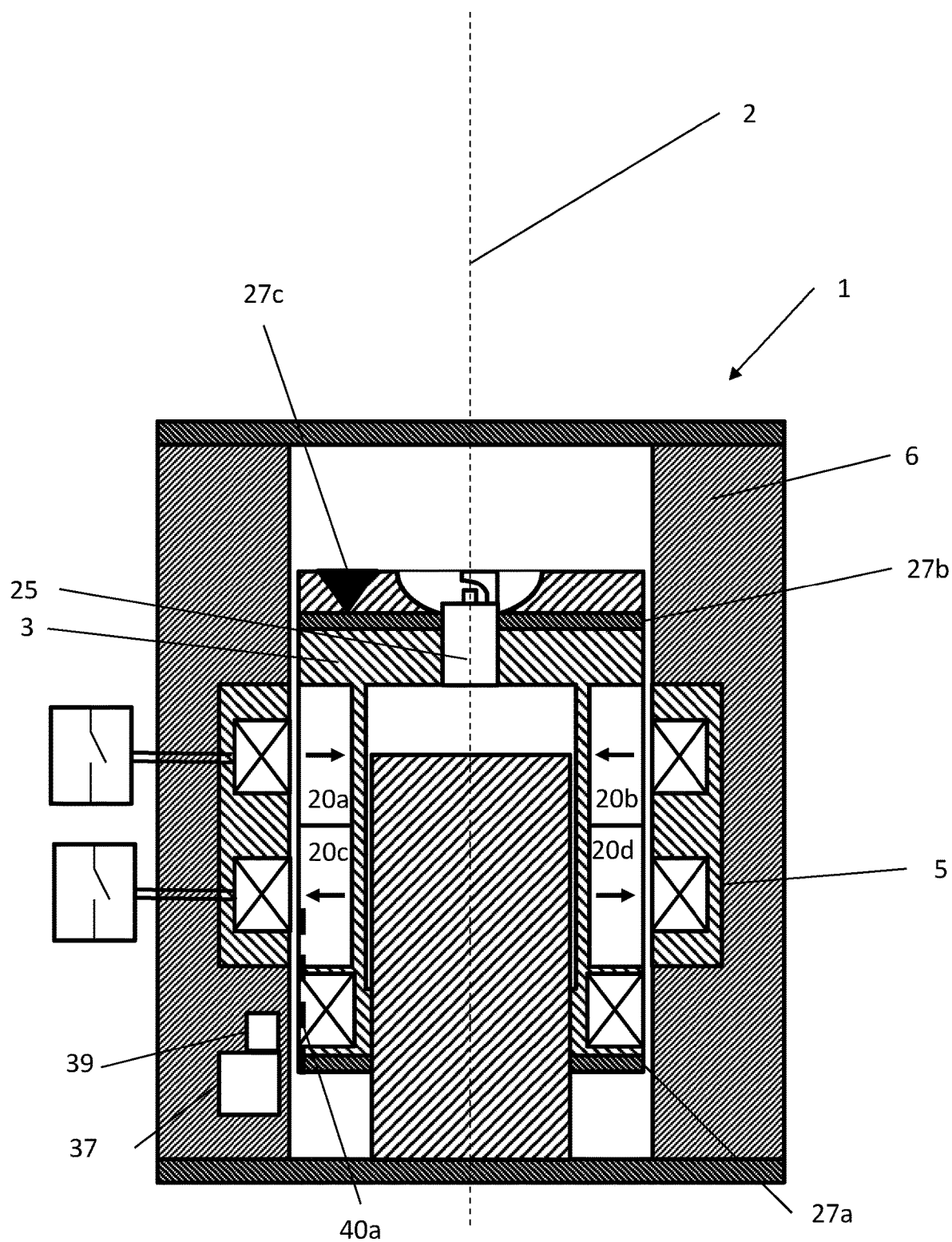
FIG. 7 is Section AA Section AA showing an active scale, associated sensor in the housing and housing-side control electronics/subsystem/device.

FIG. 7 is Section AA Section AA showing an active scale 40a, associated sensor in the housing 39 and housing-side control electronics/subsystem/device 37.

Figure 8:
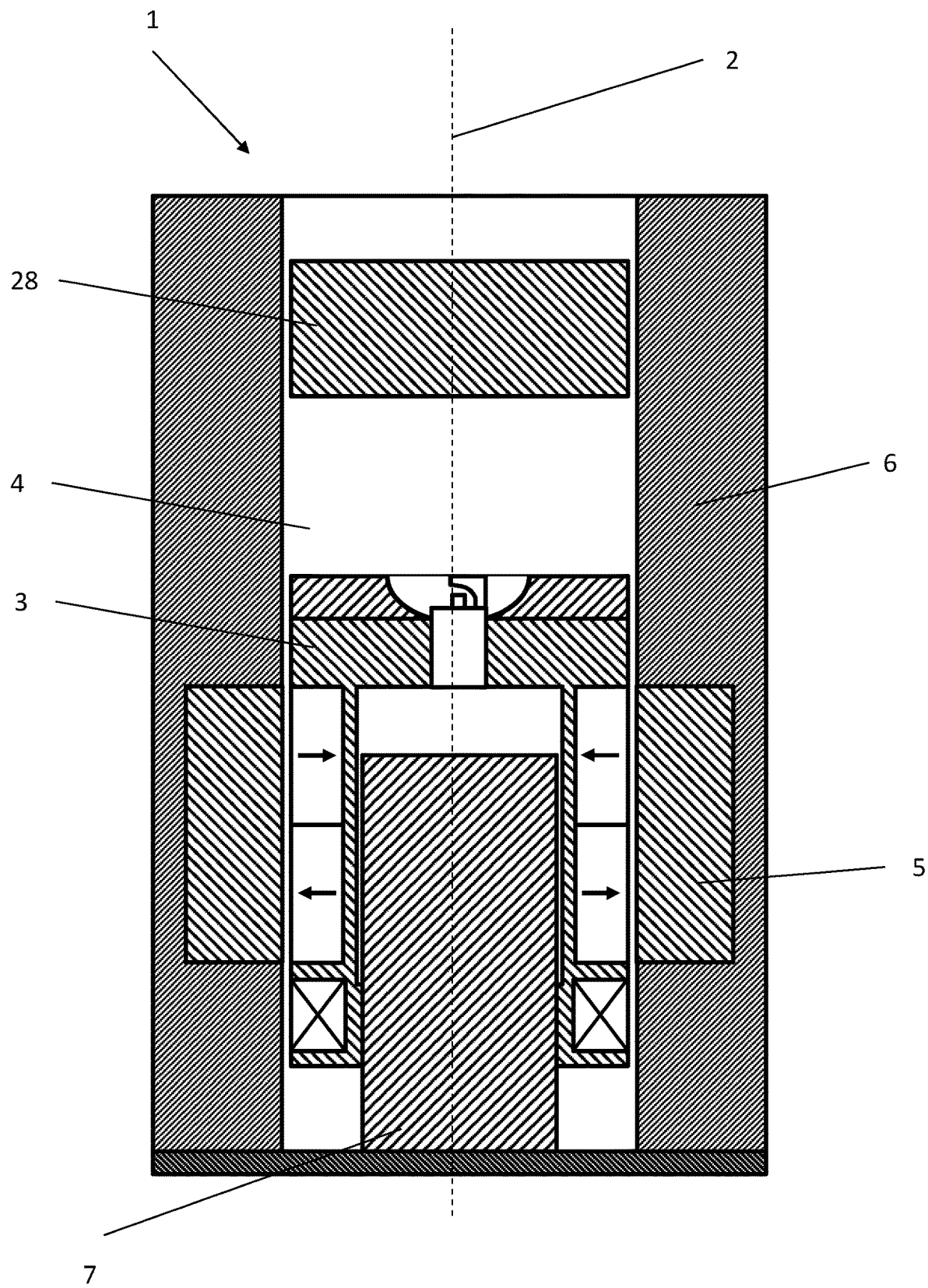
FIG. 8 is Section AA extended to add a simplified second piston and common working chamber.

FIG. 8 Illustrates the LPS of earlier Figures that is a LTFS where the working chamber 4 is a combustion chamber that is a common working chamber acting on a first FPM 3 and a second piston 28. The second piston 28 may be mechanically connected to extract mechanical work or may be a coupled to a translator forming a second FPM. This opposing piston engine (OPE) configuration has the benefit of both movers sharing a common LPS housing 6 and working cylinder 8. An effectively controlled an well designed OPE has the benefit of low vibration and low noise.

Figure 9:
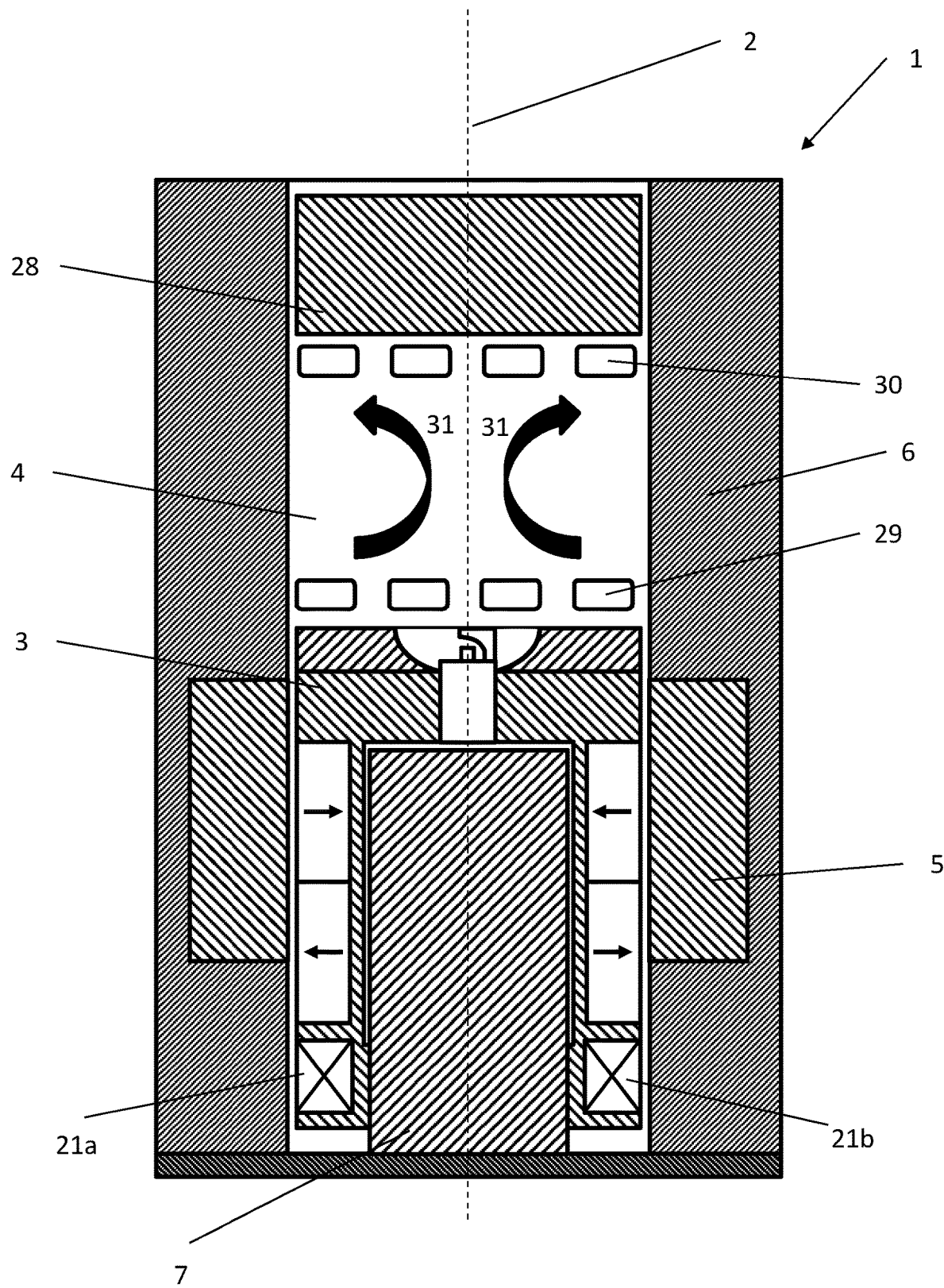
FIG. 9 shows additional detail to FIG. 8 including inlet and exhaust apertures.

FIG. 9 illustrates the LTFS of FIG. 8 additionally illustrating inlet apertures 29 and exhaust apertures 30. Fuel enters the working chamber via inlet apertures 29 which may be fuel injectors or valved ports and are located towards the piston LEM 3. Following the expansion reaction of the fuel the resultant combustion gasses will be expelled via exhaust apertures 30 for example valved exhaust ports. The flow of fuel mixture and exhaust gases therefore is as shown by the arrows representing the working chamber gas flow 31. Therefore as the thermo fluidic system cycle repeats, cool fuel is admitted close to the first FPM 3 having a cooling effect on it and in particular the piston crown 24 and optionally sensor means 27 and or combustion initiation means 25 as may be located on or embedded in the piston crown 24 or FPM 3. By contrast the second piston 28 is adjacent to the exhaust apertures to which the hot gases are expelled. Due to the high temperature of the combustion reactions and the working chamber gas flow 31 illustrated therefore the FPM 3 piston crown 24 is kept relatively cool compared to the second piston 28 which is subject to higher and potentially extreme temperatures. This differential affords the opportunity to preferentially deploy EElecCct on the cooler FPM 3 on the side of the inlet apertures.

Figure 10:
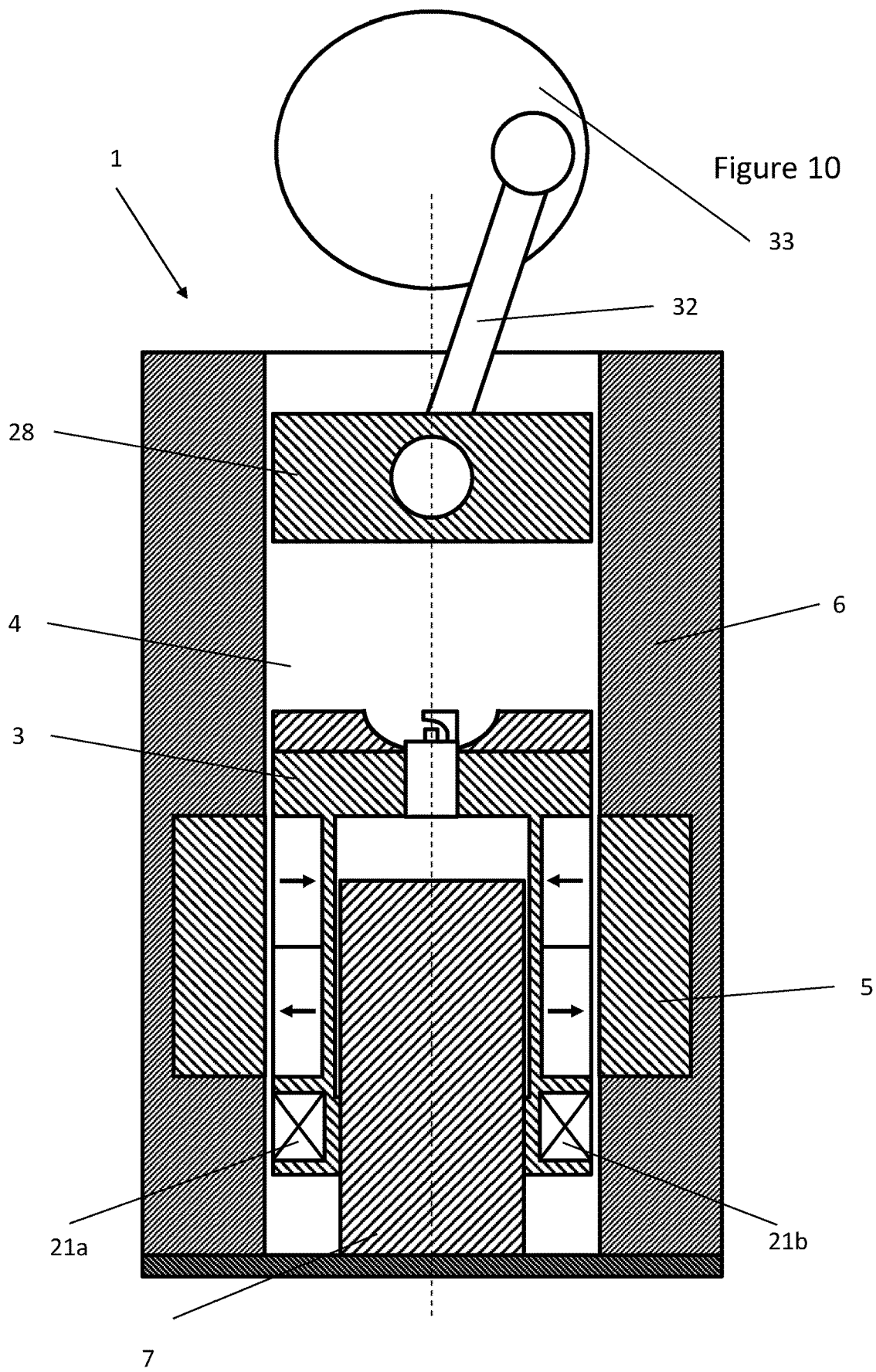
FIG. 10 show that the second piston may be connected to a crank shaft for extraction of mechanical work.

FIG. 10 illustrates the LTFS of FIG. 9 having a mechanical piston rod 32 for extraction of mechanical work. The piston rod 32 is shown here connected to a crankshaft 33 although there are many ways to extract work via a linkage such as a piston rod which include but are not limited to linear displacement actuation or connection to a flywheel or other rotating machine apparatus depending on the application.

Figure 11:
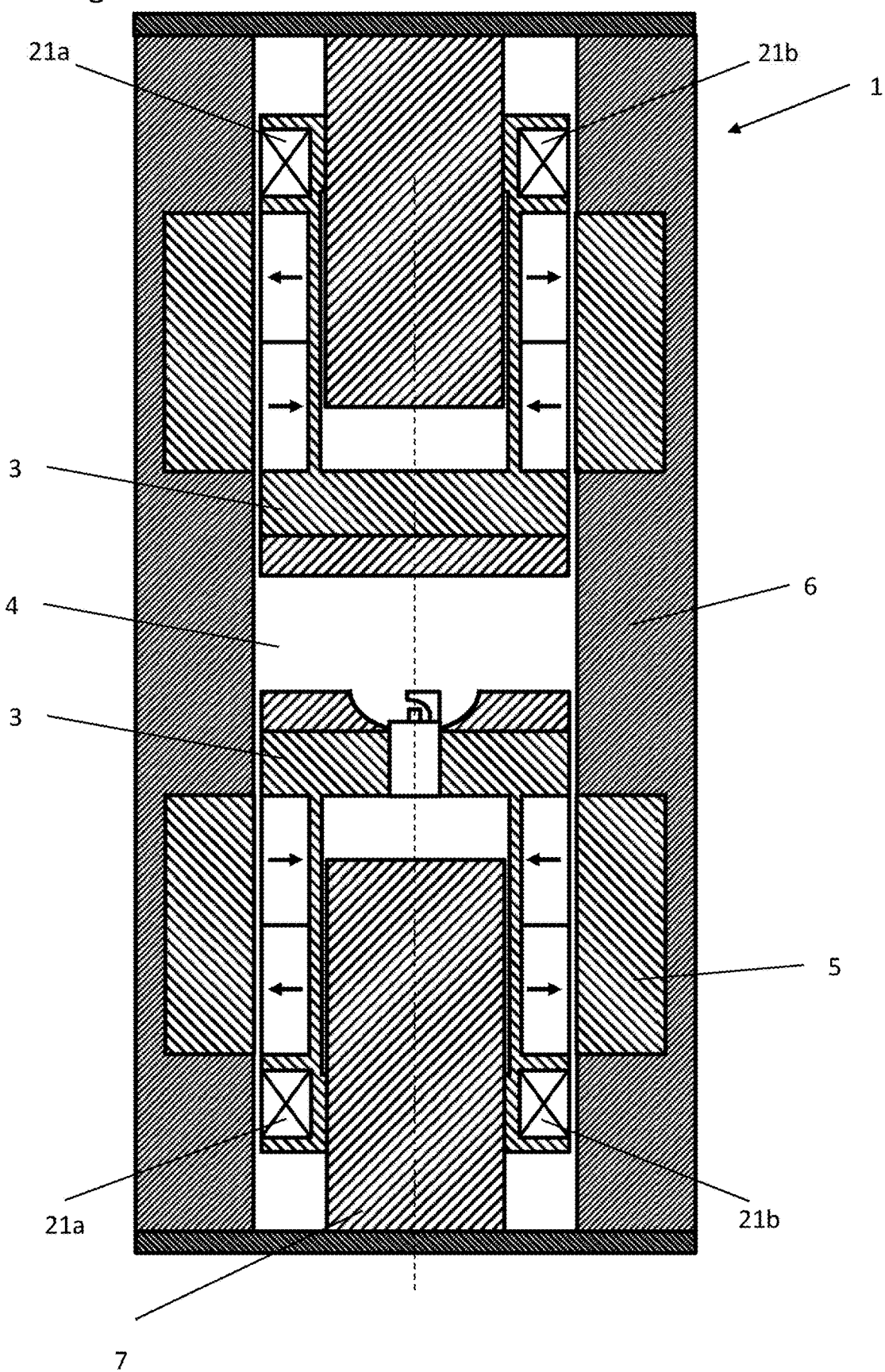
FIG. 11 is section AA having 2 FPM sharing a common working chamber.

FIG. 11 illustrates the LTFS of FIG. 9 where the second piston 28 is part of a second FPM 34. The first FPM 3 is on the cool side of the common working chamber 4 due to its proximity to inlet apertures 29 (not shown) and the cooling effect of fuel injection as described above therefore the combustion initiation means 25 if present on an FPM would preferentially be located on FPM 3 along with other EElecCct that are only required on one opposed FPM.

The second FPM 34 may also have some or all of the features disclosed for FPM 3 including but not limited to:
Fixed central core;
Independent bounce chambers;
Independent stator in LPS housing 6;
Magnetic permeable elements in FPM 34 affording independent modulation of motion of FPM 34 as well as electrical energy extraction;
Power transmitting means and power receiving means for supplying EElecCct including sensor means on PFM 34;
Data transmitter and or data receiver.

In FIG. 12 the transformer T1 is formed in two parts for at least a part of the stroke of the FPM when stator circuit 35 becomes aligned with power receiving means 21. Shown here as primary and secondary coils of a transformer T1 the switch 36 for example an H-bridge switches current in the primary stator circuit 35 which is transformed to the secondary-side coil to give an alternating current that may be rectified to a DC supply by a rectifier shown here for simplicity as a half-wave rectifier but preferably being implemented as a full wave rectifier; the rectified output of which supplies the energy storage means 22. T1 need not be a high voltage transformer being provided to supply power that may be rectified to a DC voltage to supply EElecCct on the FPM optionally with voltage regulation not shown. A dashed line is illustrative of an air gap 41 between the fixed housing and the FPM.

Energy storage means 22 provides a charge reservoir In order to maintain a power supply for EElecCCT on the FPM where T1 is operated intermittently and in order to provide a low impedance current source for EElectCct for intermittent high current demands. Energy storage means 22 is illustrated as a capacitor but may be alternatively or partially provided by a battery, capacitor or super capacitor or a combination of similar devices along with charge control and or voltage regulation.

FPM EElectCct include controller means 38 for example logic, analog electronics or a microcontroller circuit executing embedded firmware and managing one or more sensors 27 and or data communication to the fixed housing circuits.

Data communication means 42 formed of receivers, transmitters or transceivers 42a and 42b providing communication to and or from the fixed controller 37 and the FPM controller 38. 42a and 42b are illustrated as a radio frequency point to point communication path but may alternatively be inductive coupled devices or magnetically coupled devices or optically coupled devices. Further the data communication means 42a and or 42b may be independent or combined with power transmitter stator circuit 35 and or power receiving means 21.

Sensors 27 have been discussed in relation to earlier FIG. 4 and active scale 40 in relation to FIG. 7.

Active scale sensor 40 comprises a circuit element for example a printed pattern on a printed circuit board or flexible circuit or graphene either patterned or connected to a matrix of connections carrying signals; a material of varying electrical properties such as magnetically permeable material or network of components; any of which or in combination may be energized in a constant or varying manner under control of controller 38 so as to cause a varying electric and or magnetic field along its length. Disposed on or within the outer surface of FPM 3 the active scale 40 it is preferably orientated so that the varying electric and or magnetic field intersects with scale sensor 39 for example a Hall-effect device in the fixed housing and connected to or integrated with the controller 37. By the arrangement described the controller 37 may monitor and detect the motion of the FPM allowing synchronized control of its motion and events including but not limited to timing of combustion initiation including by employing combustion initiation means 25 as described in relation to FIG. 13.

In this description two novel and beneficial motion sensing disclosures are enabled by the power coupling to FPM 3 EElectCct.

1. Use of an active scale providing position sensing at a point or over a range of motion of the FPM stroke without a mechanical coupling and being space efficient within the FPM 3 volume thereby affording a mechanically short LPS 2.
2. Use of an accelerometer 27n providing improved motion detection particularly at low speeds near to the end of the FPM stroke. Absolute position may be determined by double-integration of the waveform data and reference to an index position sensor including but not limited to an active scale. Again this is does not require a mechanical coupling and is space efficient within the FPM 3 volume thereby affording a mechanically short LPS 2.

Figure 13A:
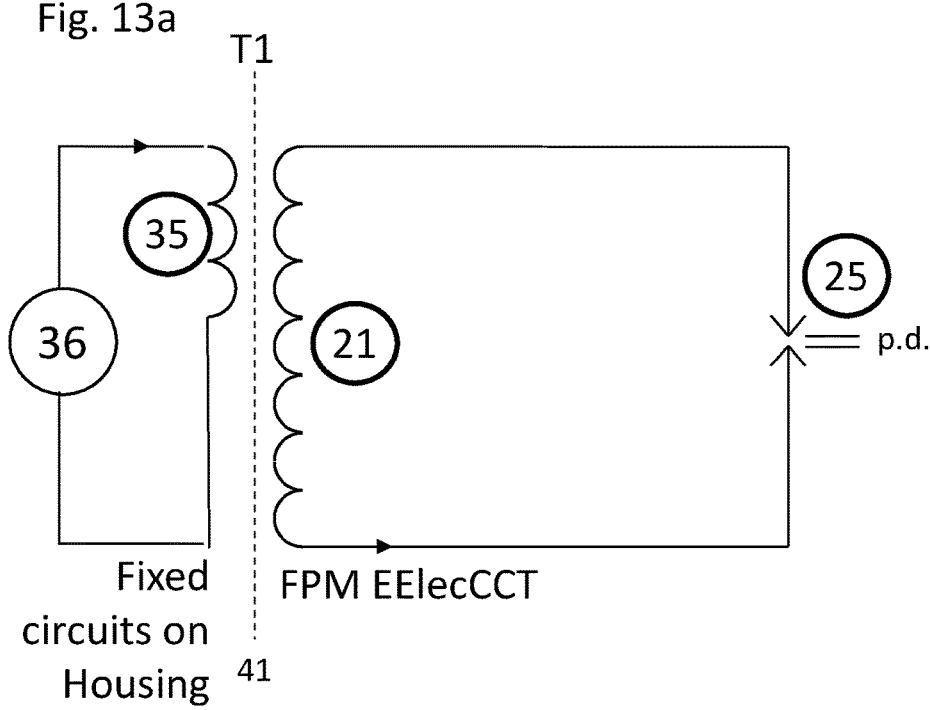
FIG. 13 illustrates a FPM stroke where BV is elapsed time and CV is position.
Figure 13B:
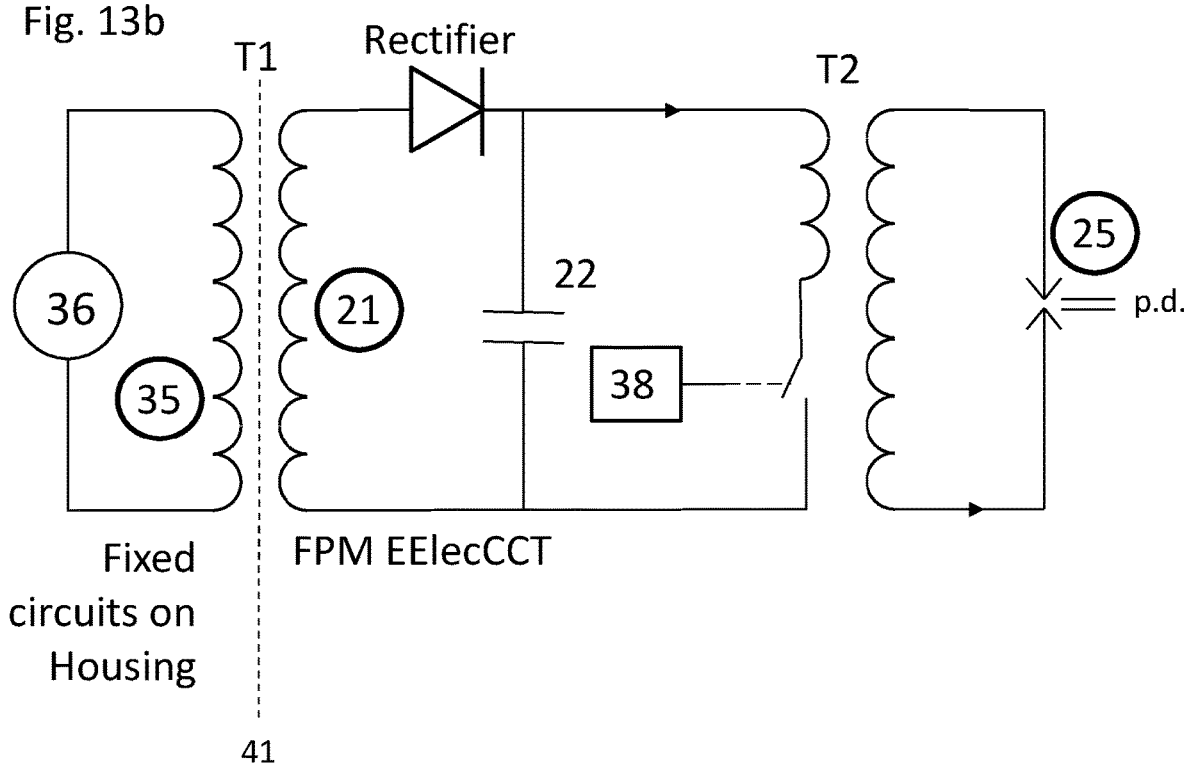

FIGS. 13a and 13b show example simplified schematics of electrical circuits as may be deployed in part of whole or as a part of EElectCct. These are example implementations and may be implemented in part or whole or in combination with other circuits not disclosed here for use on one or more FPM 3 of an LPS 2 as discussed in relation to previous Figures.

For discussion EElectCct are functionally partitioned:
  FIG. 13) combustion initiation means requiring high voltage and high currents for example spark device 25; or,
  FIG. 12) other electronics including lower power analog and digital circuits and sensor means.

For simplicity of discussion there may be duplication of some low voltage and control circuit elements in FIG. 12, 13a and/or 13b and therefore these could be combined for efficiency in an embodiment.

FIGS. 13a and 13b show alternative circuit architectures for initiation of combustion via combustion initiation means 25 illustrated as a high voltage spark device.

In each of FIGS. 13a and 13b a dashed line is illustrative of an air gap 41 between the fixed housing and the FPM.

In each FIGS. 13a and 13b a transformer T1 is caused to be formed for at least a part of the stroke of an FPM when the fixed stator circuit 35, the power transmitting means, becomes aligned with power receiving means 21 moving with the FPM; these being represented here as primary and secondary coils of transformer T1.

The switch 36 may be an H-bridge or one or more a FET, relay, TRIAC or other transistor devices.

The principle difference in architecture between FIG. 13a and FIG. 13b is that in FIG. 13a the power transferred to power receiving means 21 is directly applied without further switching or intelligence to the combustion initiation means 25; whereas, for FIG. 13b energy is transferred to the power receiving means 21 and stored in energy storage means 22 before being switched and transformed to a high voltage which is applied to combustion initiation means 25. The details of operation and relative benefits will now be discussed further.

FIG. 13a is a schematic supplying combustion initiation means 25 on an FPM for example a spark device illustrated. T1 is illustrated as a high voltage transformer formed of a primary circuit 35 in the stator region such as a coil having relatively few turns; and, a secondary power receiving means 21 such as a coil having many more turns such that when a significant DC current is caused to flow in the primary a high voltage is developed on the secondary side which may be applied to a combustion initiation means 25 illustrated as a spark device wherein the high potential difference (p.d.) causes a spark to occur.

Alternatively in FIG. 13b energy storage means 22 is charged by the action of transformer T1 in the manner described for FIG. 12. Energy storage means 22 also provides a low impedance source located on the FPM close to high voltage transformer T2. Controller 38 controls a switching circuit, for example but not limited to a FET, relay, TRIAC or other transistor, to at least partially discharge energy storage means 22 causing current to flow in the primary side of high voltage transformer T2 developing a high voltage on the secondary side which may be applied to a combustion initiation means 25 illustrated as a spark device wherein the high potential difference (p.d.) causes a spark to occur.

A benefit of the architecture of FIG. 13b is that the controller 38 in conjunction with sensors 27 not shown for clarity and dynamic control timing algorithms may simply switch the primary coil of T2 or modulate it for example by pulse width modulation (PWM) in order to exert control on over the primary side current flowing thereby controlling the discharge current in the secondary side and the combustion initiation means 25. Additional current sensing means may be added to the circuits to support this enhanced operation. Such improved discharge control may be used to improve the combustion event providing improved combustion and thereby efficiency of the system.

A number of benefits are afforded with the scheme of FIG. 13b versus that of FIG. 13a:
  In FIG. 13b the high voltage and high current switching circuits associated with the high voltage transformer T2 may all be co-located on the FPM therefore they may be kept small (shorter interconnect length and circuit loop area), lower impedence, with tight coupling possible between primary and secondary windings affording improving efficiency, improving electromagnetic compatibility and allowing more rapid rate of change of voltage across combustion initiation means 25. By contrast in FIG. 13*a* the high voltage transformer is formed between a primary coil on the fixed housing and secondary coil on the FPM which move relative to each other and are inconsistently and less well coupled.

The trigger control of controller 38 in FIG. 13*b* may be a simple off-on for each combustion initiation means firing as is realistically the only option for the circuit of FIG. 13*a* however for the circuit of 13*b* current profiling is possibly by so called a.c. triggering where the trigger control may be analog or preferably ratiometrically pulsed for example PWM at a defined duty cycle. In a further enhancement the primary coil current of the high voltage transformer T2 may be sensed by a series current sensing resistor (not shown) allowing closed-loop control of the current in the primary coil thereby controlling the potential difference p.d. seen at the combustion initiation means 25.

When the high voltage p.d. is applied to combustion initiation means 25 such as a spark gap or similar electrodes the resulting electric field may be used to stress a fuel mixture causing a current to flow which may be sensed to determine the conduction of the fuel mixture using sensing circuits 27 not shown for clarity. The sensor output may be included in a control loop for the secondary side current or indeed used to determine when to initiate the reaction or combustion of the mixture regardless of whether or not a spark occurs.

Whilst FIG. 13*b* illustrates combustion initiation means based around a spark device it will be clear that in many respects these are the most electrically challenging. Alternative combustion initiation means typically have lower voltage, lower current requirements and may not need the high voltage transformer T2 of FIG. 13*b* for example but not limited to ionization electrodes, heaters and VCSEL laser diodes.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A linear electro-mechanical system comprising:
a stator including at least first and second stator electronic circuits or groups of circuits;
a free piston mover movable in a reciprocating motion relative to the stator, the free piston mover including:
a piston surface;
a translator configured so that an electromagnetic force may be applied on the free piston mover by one or more of the stator electronic circuits or groups of circuits; and
one or more translator electronic circuits; and
a first switching device for the first stator electronic circuits or groups of circuits and a second switching device for the second stator electronic circuits or groups of circuits to independently control a configuration of the current in the first and second stator electronic circuits or groups of circuits;
wherein at least one of the translator electronic circuits is configured to receive electrical power from at least one of the independently controlled stator electronic circuits or groups of circuits during at least a part of a stroke of the free piston mover,
wherein at least one of the first or second switching devices respectively controls the first or second stator electronic circuits or groups of circuits to transmit electrical power to at least one of the translator electronic circuits during the part of the stroke of the free piston mover and to transmit motive force during another part of the stroke of the free piston mover,
a controller whose output signals activate at least one of the switching devices; and
at least one electrically operated device connected to the translator electronic circuit of the free piston mover;
wherein the electrically operated device is powered by electrical power transmitted from at least one of the electronic circuits or groups of circuits to at least one translator electronic circuit on the free piston mover.

2. The linear electro-mechanical system of claim 1, wherein the at least one electrically operated device is a sensor constituent which is one or more of: an accelerometer; a temperature sensor; a pressure sensor; an optical sensor; an acoustic sensor; an ionic sensor; or an active scale.

3. The linear electro-mechanical system of claim 1, wherein the at least one electrically operated device comprises a wireless signal transmitter.

4. The linear electro-mechanical system of claim 1, wherein the at least one electrically operated device is operable to initiate combustion.

5. The linear electro-mechanical system of claim 1, wherein the at least one electrically operated devices is an electrical energy store.

6. The linear electro-mechanical system of claim 1, wherein the at least one electrically operated device is a signal processor being one or more of: an analogue signal amplifier;
an analogue signal filter; an analogue-to-digital converter; or a digital signal processor.

7. The linear electro-mechanical system of claim 1, further comprising a position encoder read head.

8. The linear electro-mechanical system of claim 7, further comprising a sensor controller for receiving and processing data from any of the position encoder read head and/or at least one of the FPM sensor constituents.

9. The linear electro-mechanical system of claim 1, further comprising a wireless signal receiver.

10. The linear electro-mechanical system according to claim 1, wherein one or more of the groups of electronic circuits or groups of circuits includes only a single electronic signal.

11. The linear electro-mechanical system according to claim 1, wherein one or more of the groups of electronic circuits or groups of circuits includes electronic circuits.

* * * * *